US010869464B2

(12) United States Patent
Bell

(10) Patent No.: US 10,869,464 B2
(45) Date of Patent: Dec. 22, 2020

(54) CATHEDRAL HIVE

(71) Applicant: Corwin Bell, Boulder, CO (US)

(72) Inventor: Corwin Bell, Boulder, CO (US)

( * ) Notice: Subject to any disclaimer, the term of this patent is extended or adjusted under 35 U.S.C. 154(b) by 236 days.

(21) Appl. No.: 16/120,231

(22) Filed: Sep. 1, 2018

(65) Prior Publication Data
US 2019/0069525 A1 Mar. 7, 2019

Related U.S. Application Data

(60) Provisional application No. 62/553,812, filed on Sep. 2, 2017.

(51) Int. Cl.
*A01K 47/02* (2006.01)
*A01K 47/06* (2006.01)

(52) U.S. Cl.
CPC .............. *A01K 47/02* (2013.01); *A01K 47/06* (2013.01)

(58) Field of Classification Search
CPC ........ A01K 47/02; A01K 47/06; A01K 47/00; A01K 47/04
See application file for complete search history.

(56) References Cited

U.S. PATENT DOCUMENTS

| | | | | |
|---|---|---|---|---|
| 38,925 A | * | 6/1863 | Wright | A01K 47/02 449/37 |
| 97,124 A | * | 11/1869 | Sanford | A01K 47/00 449/16 |
| 120,885 A | * | 11/1871 | Lewis | A01K 47/02 449/17 |
| 507,070 A | * | 10/1893 | Hines | A01K 47/06 449/21 |
| 2,474,382 A | * | 6/1949 | Smith | A01K 47/02 449/42 |
| 3,088,135 A | * | 5/1963 | Covington | A01K 47/04 449/43 |
| 3,994,034 A | * | 11/1976 | Van Damme | A01K 47/06 449/12 |
| 4,234,985 A | * | 11/1980 | Pierce | A01K 47/02 449/43 |
| 4,374,440 A | * | 2/1983 | Drapkin | A01K 47/04 449/43 |

(Continued)

FOREIGN PATENT DOCUMENTS

| | | | | | |
|---|---|---|---|---|---|
| CN | 108012959 A | * | 5/2018 | ............. | A01K 47/02 |
| GB | 586654 A | * | 3/1947 | ............. | A01K 47/00 |

*Primary Examiner* — Kathleen I Alker
(74) *Attorney, Agent, or Firm* — Giordana M. Belenchia

(57) ABSTRACT

A hive for housing honey bees, including a substantially hollow hexagonal shaped structure including a three-side base forming one-half of the hexagon and a three-sided exterior roof forming the other half of a hexagon, the base and the roof configured to fit together with a front plate and an end plate to form the substantially hollow hexagonal structure to house the hive; and at least one interior bar in the shape of one-half of a hexagon configured to rest on top of the base and under the roof such that the half hexagonal shape of the interior bar approximately matches the half hexagonal shape of the roof, the interior bar having a plurality of openings extending through its cross-section for bees to travel through, the interior bar being configured to retain a honeycomb hanging therefrom, the honeycomb being able to hang down into the base.

7 Claims, 12 Drawing Sheets

(56) References Cited

U.S. PATENT DOCUMENTS

| | | | | |
|---|---|---|---|---|
| 4,672,704 A * | 6/1987 | Hong | ............... | A01K 47/02 449/3 |
| 6,450,858 B1 * | 9/2002 | Schmitz | ............ | A01K 47/06 449/20 |
| 7,390,238 B2 * | 6/2008 | Le Pabic | ............ | A01K 47/06 449/2 |
| 2003/0027490 A1 * | 2/2003 | Wilkinson | ......... | A01K 47/02 449/38 |
| 2011/0312244 A1 * | 12/2011 | Vincent | ............ | A01K 47/02 449/26 |
| 2017/0035033 A1 * | 2/2017 | Adams | ............ | A01K 47/06 |
| 2019/0246611 A1 * | 8/2019 | Clow | ............ | A01K 47/02 |
| 2019/0350176 A1 * | 11/2019 | Perkins | ............ | A01K 47/06 |

* cited by examiner

CATHEDRAL HIVE

CROSS REFERENCE TO RELATED APPLICATIONS

The present application claims the benefit of and priority to U.S. Provisional Patent Application Ser. No. 62/553,812 filed on Sep. 2, 2017, the entire contents of which are incorporated herein by reference.

BACKGROUND

Technical Field

The present disclosure relates to new and improved designs and construction of honey bee hives that support the survival of genetically sound honey bees that are better able to survive environmental changes and human bee farming impact.

Discussion of Related Art

There has not been much in terms of innovation in the bee hive design for over a hundred years. In 1851, Reverend Lorenzo Lorraine Langstroth invented a better beehive and changed beekeeping forever. Before the langstroth hive, many bees were kept in skeps, or basket hives or in log hives, which required the beekeeper to open the hive and cut comb hanging in the hive, often causing the destruction of the colony of bees.

The Langstroth Hive: The issue with the Langstroth hive (Lang hive) for backyard beekeepers is that the hive was designed with commercial honey production in mind. The boxes are loaded with frames that have a wax sheet insert "foundation" and more recently plastic foundation, both of which create different health challenges for the bees. For backyard beekeepers the heavy boxes are unmanageable and the extra expense of having to own or lease a honey spinner to extract the honey from the comb is not economically feasible for small operations or backyard bee keepers. The Lang hives also have not proven very sustainable for the bees, as they are designed for humans and not ultimately for the health of the bee colony. Many of the design features of the lang hive prevent the bees from creating a healthy "open" brood nest; instead the beekeeper "manages" the brood nest with queen excluders and the adding additional boxes. The Lang hive design limits the bees ability to regulate the temperatures of the hive, especially cold temperatures, which reduces the bees chances to successfully overwinter in cold climates. Langstroth had partially solved the problem of cross comb by using square frames and foundation sheets that forced the bees to stay within the frame, but the frame and the foundation came with other unintended consequences, mainly environmental pesticides infusing the wax used for the foundation. Bees vibrate combs for communication purposes, and with the fixed frame, the bees' ability to send sonic signals through the dark are limited. These design flaws of the Lang hive eventually caused a reemergence of a much simpler and inexpensive hive design, one which dates back to ancient Grease. The "top bar hive" is also the design predominantly used in third world countries because of its simplicity and low cost to build.

The Top Bar Hive: The top bar hive is an angled sided box with straight bars about a foot long that span the top of the box. These bars enable the bees to attach combs to the bars and allow the beekeeper to lift out one bar at a time for inspection or for harvest. The harvesting is a free and simple method of extracting the honey from the top bar comb, called "crush and strain". The difficulty of the emergent modern top bar hive design is the stability of the combs, because the combs are suspended from a single attachment point along the bar they are prone to break off when managing the hive.

Fixed Volume Issues: Unlike the Lang hive, which enables the beekeeper to take advantage of strong honey flows by expanding the volume of the hive by adding extra boxes with frames, the top bar hive is a fixed volume, so the beekeeper needs to be constantly pulling honey combs from the back of the hive.

Over Wintering Issues: The top bar hive design also has its challenges overwintering due to the way that the brood in winter clusters at the top of the hive where the temperature gradient favors warmth, but the design doesn't allow for enough overhead honey stores providing much needed thermal mass or heat storage. It is akin to having a single story house with no insulation in the attic.

Cross Combed Issues: The combs in a top bar hive have a poor reputation of becoming "cross combed" at the back of the hive. Cross combing is when the combs built by the bees are not aligned on each consecutive bar, but instead are constructed with a curve that attaches to several bars at a time. This issue makes it very difficult for the bee keeper to manage the hive, because one bar cannot be simply removed, combs become a complicated cluster connected to several bars at once. This cross combing is the result of ventilation issues where the bees actually construct the curved comb to create air flow channels, like the sails of a boat or the fins on airplane wings.

Brace Comb: When the bees architect the heavy honey combs they instinctively know that the minimal bar attachment along the top will be insufficient. To remedy the comb instability, the bees create abundance of what is called "brace comb" a wax extension of the comb that adheres to the sides of the hive. This means that the beekeeper in the top bar hive has to cut the brace comb from each honey comb they want to remove.

SUMMARY

Provided in accordance with the present disclosure is a hive for housing a plurality of honey bees that includes a substantially hollow hexagonal shaped structure that includes a three-side base forming one-half of the hexagon and a three-sided exterior roof forming the other half of a hexagon, the base and the roof configured to fit together with a front plate and an end plate to form the substantially hollow hexagonal structure to house the hive; and at least one interior bar in the shape of one-half of a hexagon configured to rest on top of the base and under the roof such that the half hexagonal shape of the interior bar approximately matches the half hexagonal shape of the roof, the interior bar having a plurality of openings extending through its cross-section for bees to travel through, the interior bar being configured to retain a honeycomb hanging therefrom, the honey comb being able to hang down into the base.

The interior bar can be composed of three segments, including a top segment and two side segments, all situated at hexagonal angles relative to one another. The top segment of the interior bar can include a lateral vent extending along at least a portion thereof configured to allow passage of air in and out of the hive for ventilation, without allowing passage of bees. The base can include a ledge situated on an interior surface thereof and configured to retain the outer edge of the interior bar. There can be four openings substantially equidistantly placed, extending through the cross-section of the interior bar.

The hive can also include a plurality of interior bars situated side-by-side and extending along a full length of the hive. In some embodiments, the interior bar can have a cross-section shaped like an equilateral triangle. The hive can also include a ventilation slot extending through the front plate and the end plate such that the slot allows ventilation across the top of the interior bar and below the roof. In some embodiments, the hive can further include a ventilation drawer configured to be adjustably and removably engaged with the ventilation slot such that it can be rotated and moved to allow different levels of ventilation across the interior bar and/or through the openings in the interior bar. The front panel can include an opening near its base to allow bees in and out of the hive, and can further include a landing board extending out from the opening for the bees to land on as they pass in and out of the hive.

BRIEF DESCRIPTION OF THE DRAWINGS

Various aspects and features of the present disclosure are described herein below with references to the drawings, wherein.

DETAILED DESCRIPTION

The present disclosure is related a new and improved bee hive designs with structures that enables honey bees to more naturally move through and manage their environment, resulting in healthier and more disease resistant bee populations.

Cathedral Hive System

The invention of the Cathedral Hive system solves all of the short falls of the two predominant hive designs described in the background, while it also provides an additional extension "The Honey Loft" for existing top bar hives, enabling beekeepers to resolve several of the traditional top bar hive design short falls. The Cathedral Hive is not a modified Lang hive nor is it a modified top bar hive. It is a complete bee hive design in and of itself.

The Cathedral Hive Body: The Cathedral Hive design 10 shown in FIG. 1 has a hexagonal shape that creates a more spherical hive cavity, which provides an optimal shape for honey bees to use as a hive. The more round hexagonal shape allows for non-stagnant air pockets which are inevitable with 90-degree corners and with a square hive body found in traditional, prior art hives. During the winter months the hexagonal shape enables the bees to establish their winter cluster high into the warmer top of the hive, while still being able to maintain a crescent of stored honey as thermal mass above and around them. The volume of the hive is twice that of conventional top bar hives, so it is not necessary to "super" or add additional boxes. Each comb can be easily lifted from the hive and processed using the crush and strain method.

Figure 1:
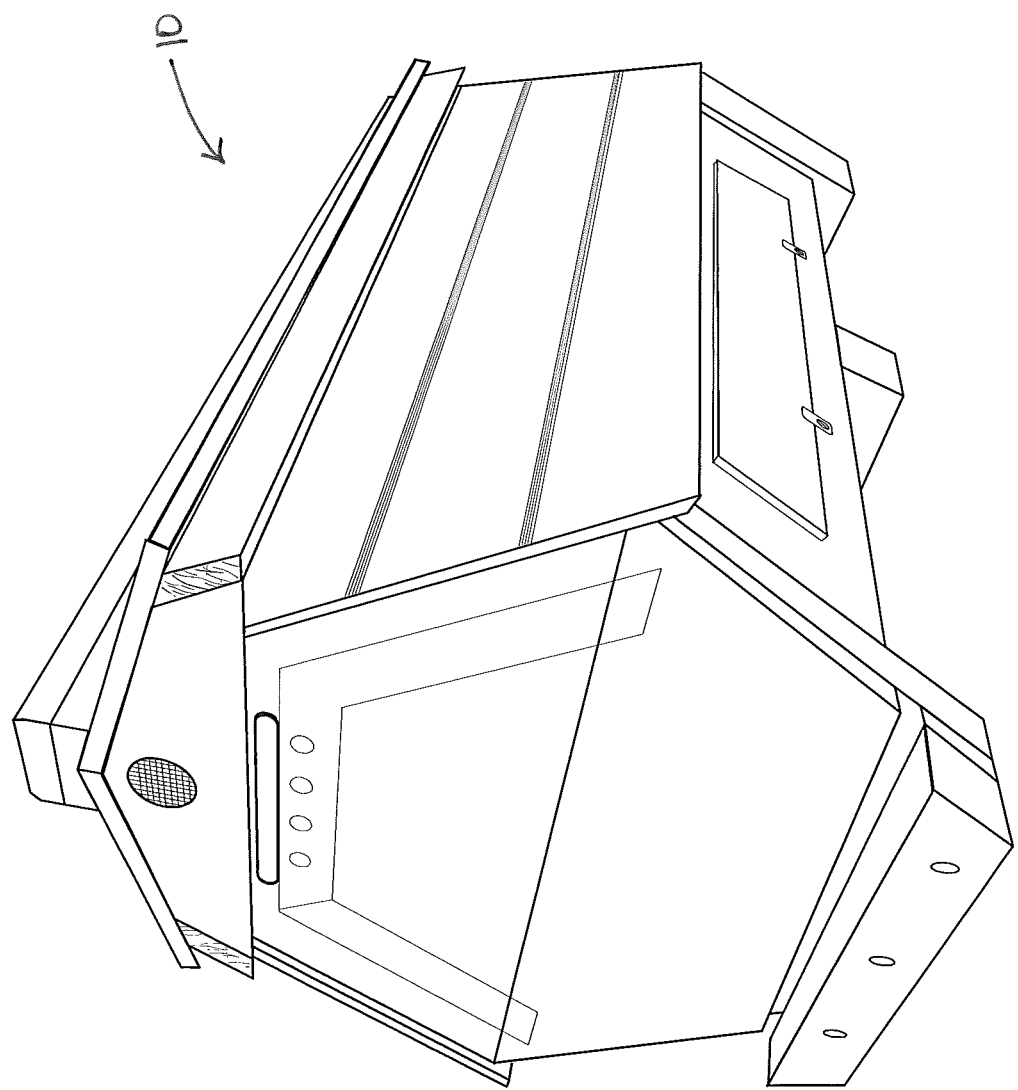
FIG. 1 is a perspective view of one embodiment of the cathedral hive.
Figure 2:
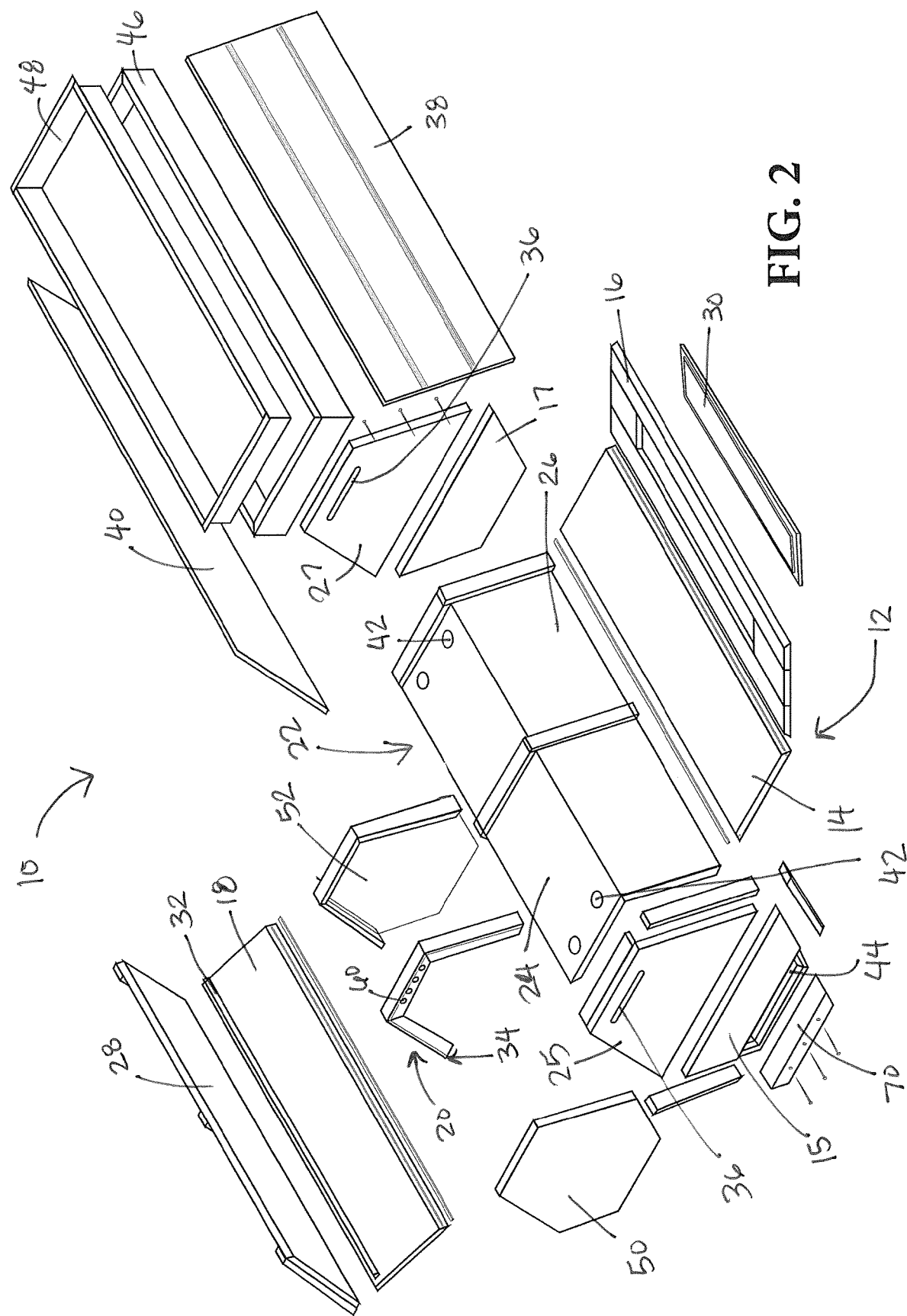
FIG. 2 is an exploded view of the cathedral hive.
Figure 3:
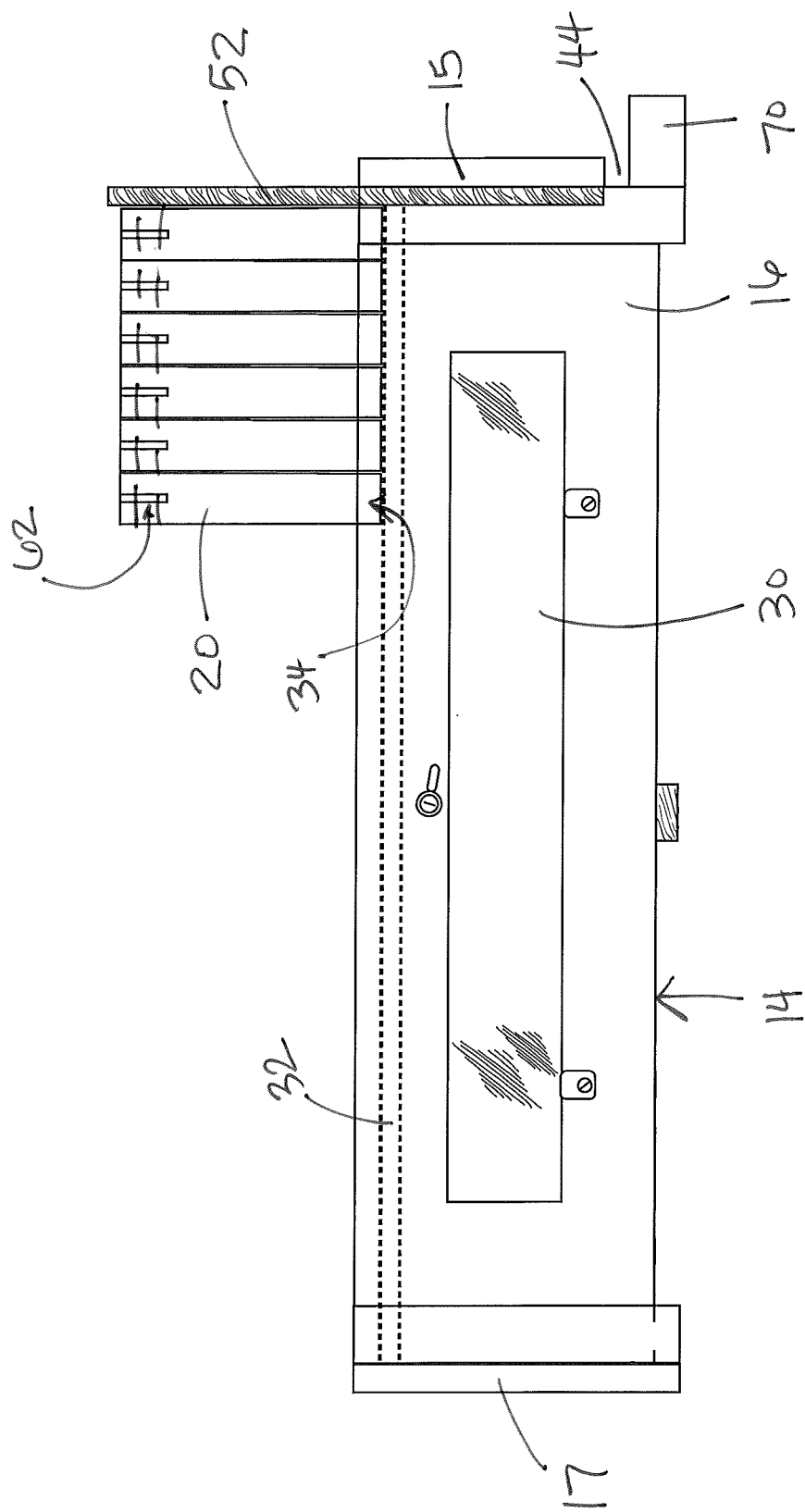
FIG. 3 is a side view of the cathedral hive.

As shown in FIG. 1 and in FIG. 2, the new and improved bee hive 10 can be a generally hexagonal shape and can be composed of a half hexagonal base 12 made of three portions 14, 16, and 18 with the angles of a hexagon. A series of removable top bar segments 20 are aligned side to side to form an interior top of the hive 10 in a hexagonal shape, as also shown in FIG. 3. A roof 22 forms the other "half" of the hexagon matched to the base 12. The base 12 of the hexagon can be composed of the flat bottom portion 14, two side portions 16, 18 extending up at an angle from the flat bottom portion 14 with any customizable length as needed, and two end panels 15, 17. One or more of the end panels 15, 17 can have an opening 44 near its base of any width and height as desired to allow an entry and exit point for the bees. In addition, a landing board 70 can be attached to or near the opening 44, providing a place for the bees to land, cool off, and inspect forger bees returning to the hive.

The roof 22 can be composed of a top flat roof portion 24, two angled side portions 26, 28 extending therefrom, and two vented end panels 25, 27. The top flat roof portion 24 can include one or more holes or openings 42 extending therethrough for air flow and ventilation through the hive. The vented end panels 25, 27 can include one or more elongated vented openings 36 to allow air flow in and out of the hive. The roof 22 can also include two exterior panels 38, 40 offset a distance from the angled side portions 26, 28 to allow air flow in and around the hive. The roof 22 can have one or more exterior roof constructions 46, 48 designed to top the hive 10 that can be used as option function spaces to contain plants, flowers, or other vegetation, and/or water features or other designs. The roof 22 can be removable from the base 12 to access the interior top bar segments 20. One or more of the bottom and top side portions 16, 18, 26, 28 can include a clear pane of plastic or glass and/or hingable or removable window cover 30 of any size as desired so that the hive can be viewed therethrough.

The base 12 can also contain a recessed ledge 32 extending linearly along its length designed to securely hold an outer edge 34 of the interior top bar segments 20. There can be any number of top bar segments 20 as needed to fill the length of the hive 10. There can also be two end panel segments 50, 52 that serve as end caps for the interior top bar segments 20. The hive 10 can be made of any suitable material including, but not limited to, wood and wood products, plastics, metals, and other organic and inorganic materials. The various components of the hive 10 can also be composed of different types of materials in combination as desired.

Figure 6:
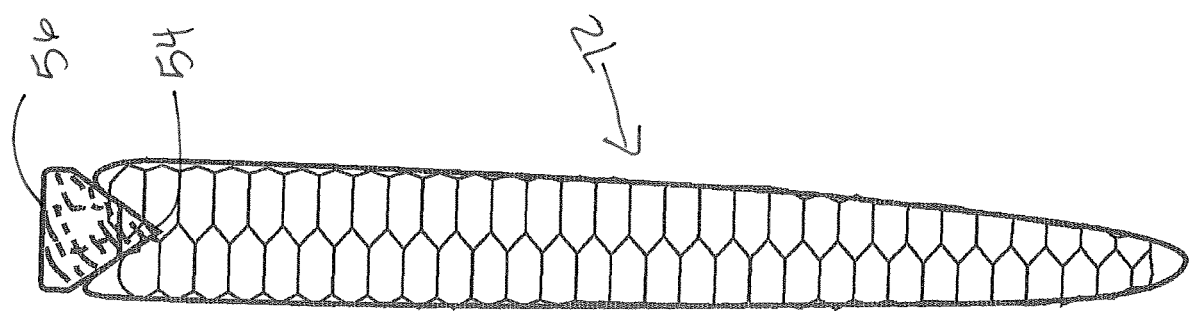
FIG. 6 is a cut-away view a top bar segment showing a straight comb.

The Cathedral Hive Bars: The unique Cathedral bars are made of three segments that form half of a hexagon. The triangular profile of the bars 20 create ample incentive for the bees to attach combs securely to the center of each bar 20, which allows the hive to be foundationless. As shown in FIG. 6, the bees suspend combs 72 from the hexagonal bars 20, leaving a non-attached space on the bottom sides and bottom of the hive. The bars in the cathedral hive are machined in a way that offer several unique design features and functions.

Brace Comb: Unlike traditional bar hives, which encourage brace comb, the cathedral hive with its half hexagonal bar structure gives the bees plenty of attachment area so there is nearly zero brace comb attachment. Because the comb is free hanging and not held with-in a full frame, the bees are able to flex the comb structure, which they do in order to communicate through vibration.

Figure 4:
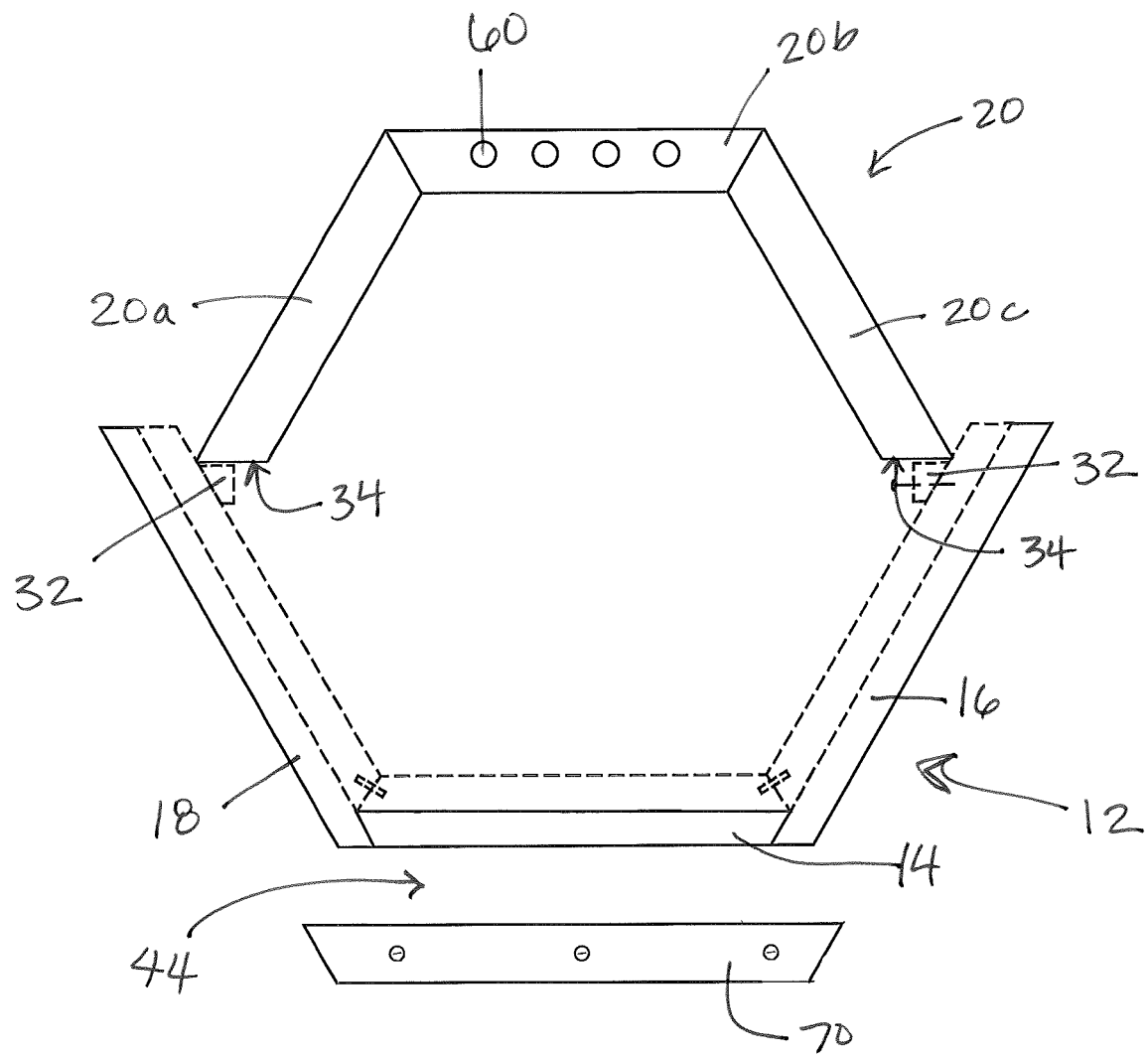
FIG. 4 is a cross-sectional view of the cathedral hive.
Figure 5:
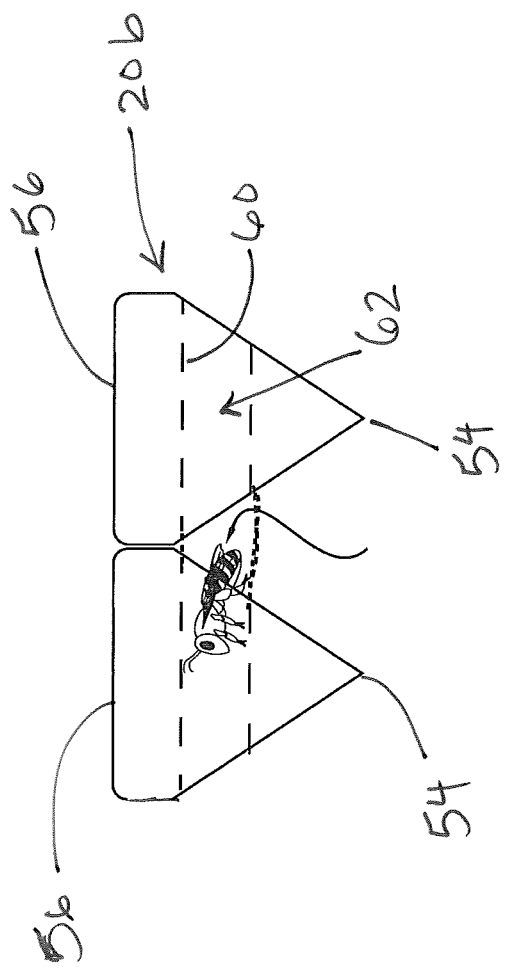
FIG. 5 is a cross-section of two top bar segments showing the passage creating for the bees by the openings.
Figure 7:
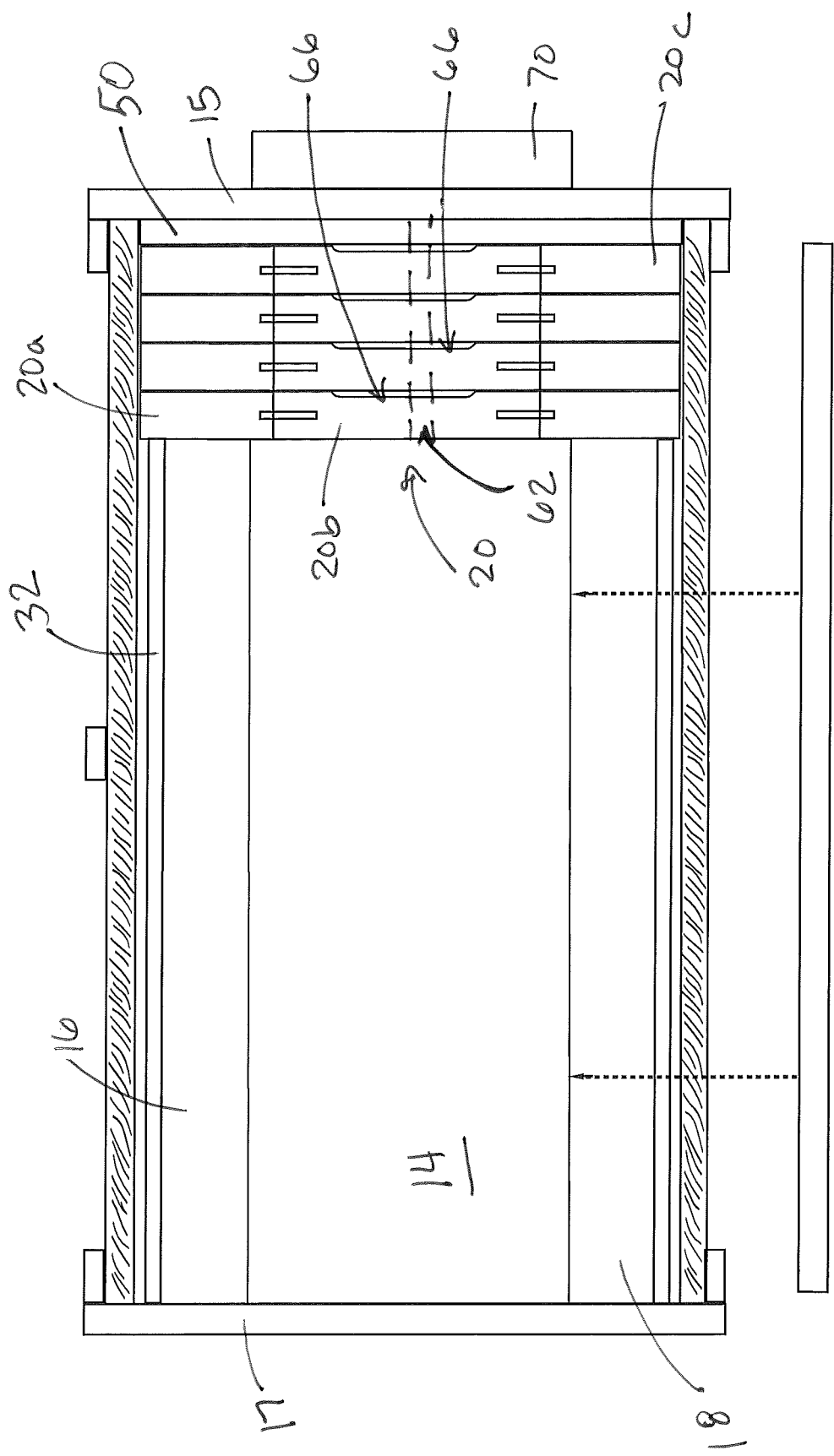
FIG. 7 is a top view of the hive and the top bar segments.

As shown in FIG. 4, the top bar segments 20 can be individually removable from the base 12 for hive viewing and maintenance and can also be removable in groupings of two or more segments 20 for the same reason. Each top bar segment 20 of the hive can be composed of a series of three separate and individual bars 20a, 20b, 20c, joined together, at hexagonal angles. The bar segments 20 can have any cross-sectional shape as needed, but in one preferred embodiment, they have a generally equilateral triangular cross-sectional shape, as shown in FIGS. 5 and 6, such that the point or tip 54 of the equilateral triangle is pointed inward towards the hive and the flat "bottom" 56 of the equilateral triangle is facing outward, serving as an exterior of the hive 10 sitting under the roof 22. The three individual bars 20a, 20b, 20c can be joined together with any number of mechanisms to form one top bar segment 20 including glues, fasteners, screws, and press-fit mechanisms, but in one preferred embodiment, the three bars 20a, 20b, 20c are joined together using a spline joint. In other embodiments, each top bar segment 20 can be a single, unitary piece without any joints throughout. The top bar segments 20 are set on the recessed ledge 32 of the base 12 such that the outer edge 34 of the top bar 20 comes into contact with the ledge 32. The top bars 20 are situated next to one another such that the side faces of each bar are physically contacting the side faces of adjacent bar, as shown in FIG. 7. This hexagonal structure gives the bees maximum potential for forming a straight and stable comb with a size of their choice, as shown in FIG. 6. The top bar segments 20 can be made of any material including, but not limited to, wood and wood products, plastics, metals, and other organic and inorganic materials.

Figure 9:
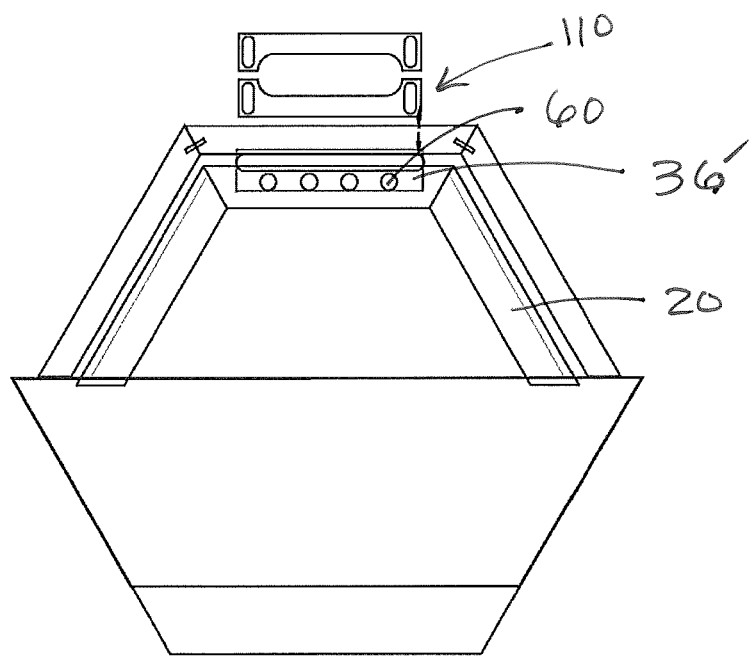
FIG. 9 is a cross-sectional view of the ventilation drawer.
Figure 10:
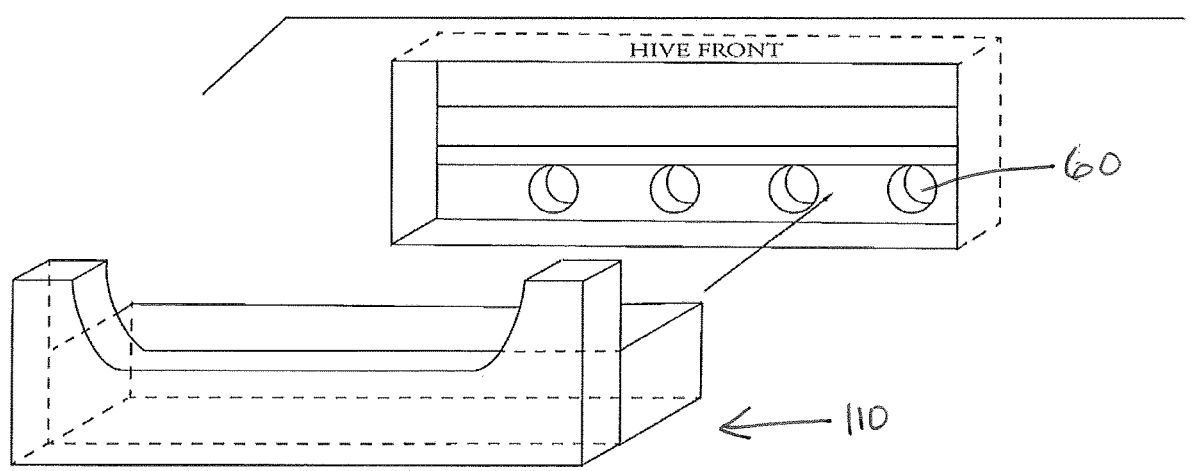
FIG. 10 is a perspective view of the ventilation drawer.
Figure 11:
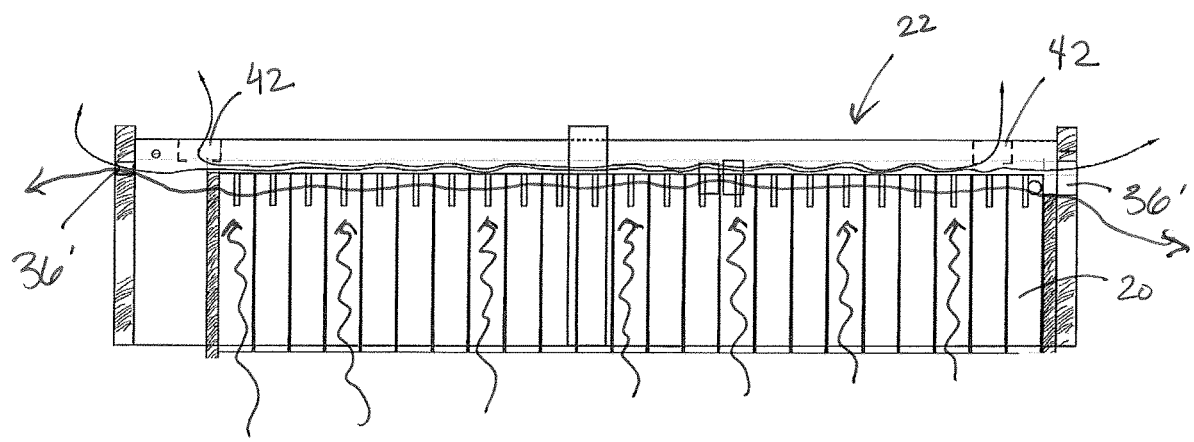
FIG. 11 is a side view showing ventilation pathways.

As shown in FIGS. 4, 5, and 7, each top bar has a series of openings 60 extending longitudinally though the uppermost bar 20b creating passages 62 that extend along the full length of the hive 10. These openings 60 can have any shape and size as desired, and there can be any number of openings 60 extending through the upper most bar and/or the side portions of the top bar segment 20. In a preferred embodiment, however, there are four circular openings 60 that are one-half inch in diameter extending through the upper-most bar 20b. These circular openings 60 can also have any diameter as desired between a quarter inch and two inches, depending on the width of the upper-most bar 20b. These openings 60 extend to form four passages 62 so that there are four contiguous inline tunnels through the entire length of the hive 10. In a preferred embodiment, these passages 62 do not vent to outside the hive 10 unless a ventilation drawer 110, shown in FIGS. 9-11, is positioned to do so. These passages 62 enable the bees to move air along the entire length of the hive 10 for the internal regulation of the hive. The four passages 62 provide a "super highway" for the bees, increasing their efficiency, health, and ability to overwinter. Rather than having to build curved combs or force other "highways" through or along the sides of an already crowded hive, as they are required to do in prior art hive designs, the passages 62 at the top of this new and improved hive design allow the bees to efficiently move through the hive, providing increased potential for nest build up, health, and productivity. These passages 62 also allow the bees to reach their honey stores as necessary during the winter without freezing to death in trying to move through a "cold zone" around the combs to reach the honey stores. Instead, the bees are able to move in clusters through the warmer passages 62 along the top of the hive to reach the honey stores.

Colony Division, Pathogens and Productivity: The passages 62 also create a natural separation of possible pathogens from the vulnerable brood nest. Incoming foragers, bees that go out into the field and collect nectar and pollen from flowing plants, often carry environmental toxins and pathogens when they return to the hive. Foragers can harbor many possible toxins that range from fungus's, bacteria, parasitic mites or pesticides, any of which could be detrimental to the hives health and its survival. The forager bees, when returning to the hive, can use the passages 62 rather then the busy floor of the hive, which is crowded with house bees. The foragers will enter the hive and move up to the top of the hive, using the passages 62 to head to the location which they will deposit their nectar or collected pollen. Because the house and nurse bees need sanitary conditions for the raising of brood and feeding larva, the passage 62 divide the bees allowing for potential pathogens to be separated from the vulnerable brood nest. This division also helps the colony's economy, allowing for a more efficient and productive hive.

Over Wintering: As noted above, the passages 62 provide the ability for the bees to migrate through the honey stores in the winter. The bees consume the honey stored in the combs in the winter and convert the sugars into BTU's (a measure of thermal energy). They do this by consuming honey and "shivering" or vibrating their wing muscles to generate heat. The bees must be able to move efficiently through the reserved honey stores in the winter to survive. Other hive designs leave no passageways for the bees to stay in the warm part of the hive, but require the bees to go around the fixed combs at the cold hive sides in order to migrate to the honey stores. The cathedral hive top bar segments 20 allow the bees to move through the passages 62 at the top of the hive, the warmest location of the hive, to reach the honey stores.

As shown in FIG. 7, the upper most bar 20b of the top bar segments 20 can also have an indentation vent 66 cut into its side, extending approximately the length of the four openings 60, for ventilation. These vents 66 can be large enough for air to get through, but not large enough for bees to pass through. When placed side by side, the top bar segments 20 can generally sit flush together with the vent 66 forming a small opening between each bar for ventilation. These vents 66 allow heat to move up and dissipate out of the hive 10, if necessary, or can be sealed or closed during winter to prevent heat from leaving the hive 10. These vents 66 can be customized by the bees or by a bee keeper to regulate the amount of ventilation allowed into the hive, depending on the season. These vents 66 allow the bees to determine how much venting they want, and they can self-regulate the movement of air, by closing off vents. For example, in the summer, all or the majority of these vents 66 may be left open for more ventilation. In the winter, most or all of the vents 66 may be sealed closed using wax or propolis such that ventilation is reduced to keep in warm air. The bees can actually "fan" standing stationary and using their wings, move air through the vents 66. The vents 66 are important for extreme and persistent heat waves. The bees in the cathedral hive 10 are in complete control of their ventilation via these vents 66. Because the bees have the ability to collect a substance called propolis, a sticky glue gathered from deciduous trees, they can close off the amount of ventilation or keep open the slots or in order to create the necessary amount of venting that is required for their well-being. Both the passages 62 and the vents 66 work in conjunction so that there is no need for the bees to create curved or cross comb to keep air flow toward the back of the hive.

Figure 8:
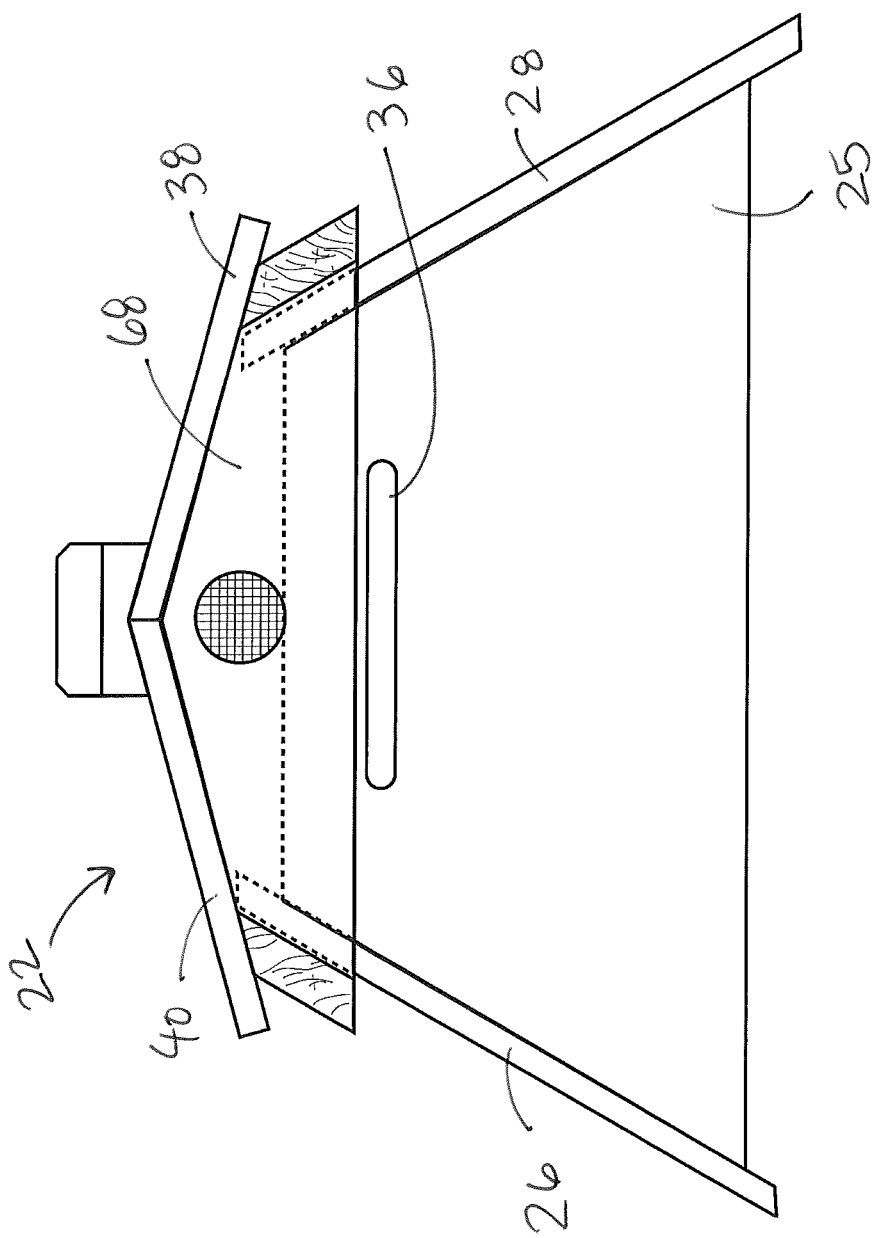
FIG. 8 is an end view of the vented roof.

As shown in FIG. 8, there is a space 68 beneath the roof side panels 38, 40 where heat that is generated by the sun hitting the side panels 38, 40, flows up and out of the top of the hive 10. There is also space to slide "pink board" insulation sheets into the space beneath the side panels 38, 40 during colder seasons if desired. The long oval vents 36 in the front and back panels 25, 27 provide cross ventilation over the top bars, and with the addition of the vertical vents 66 in the top bars 20 themselves, this creates an efficient way to for air to flow freely. Four circular vents 42 in the upper section of the hive 10 provide air flow in the event that the air is still, with no breeze. The whole ventilation system is determined by how much the bees open or close the inner top bar vents 66.

In some embodiments, a ventilation drawer 110, shown in FIGS. 9-11, can be included in the hive and inserted into vented openings 36' in the front and back panels 25, 27. The drawer 110 can be removably and rotatably engaged with the openings 36'. The drawer 110 allows the beekeeper to manually vent the top section of the hive 10 with three different levels of air flow depending on the orientation of the drawer 110. When used in the standard upright position shown in FIG. 10, the airflow only flows above the bars 20 and moves hot air that is issuing from the vents 66 in the top of the bars 20. The bees are then able to control the amount of venting necessary by sealing or closing the vents 66 with propolis. If the drawer 110 is flipped 180 degrees and then reinserted into the opening 36', then the airflow vents directly through the passages 62 formed by openings 60 in the bars. This position of the drawer 110 greatly increases the movement of hot air from the hive. This would be used in the case of a sudden heat wave or if the bees are observed "bearding" or clumping in large numbers on the landing board 70 of the hive 10. If the drawer 110 is positioned to vent through the passages 62, but is pulled out ¼ inch, then the bees can access the space above the bars 20. This is very effective for controlling small hive beetles, because the bees now have access to all parts of the hive 10. The bees will also seal up and popolize the vents 66 from the outside in. Giving the bees access to the top most part of the hive is excellent for two weeks in the fall when the bees are closing up the hive for winter. It insures they get the perfect winter seal on the entirety of the hive 10.

Figure 12:
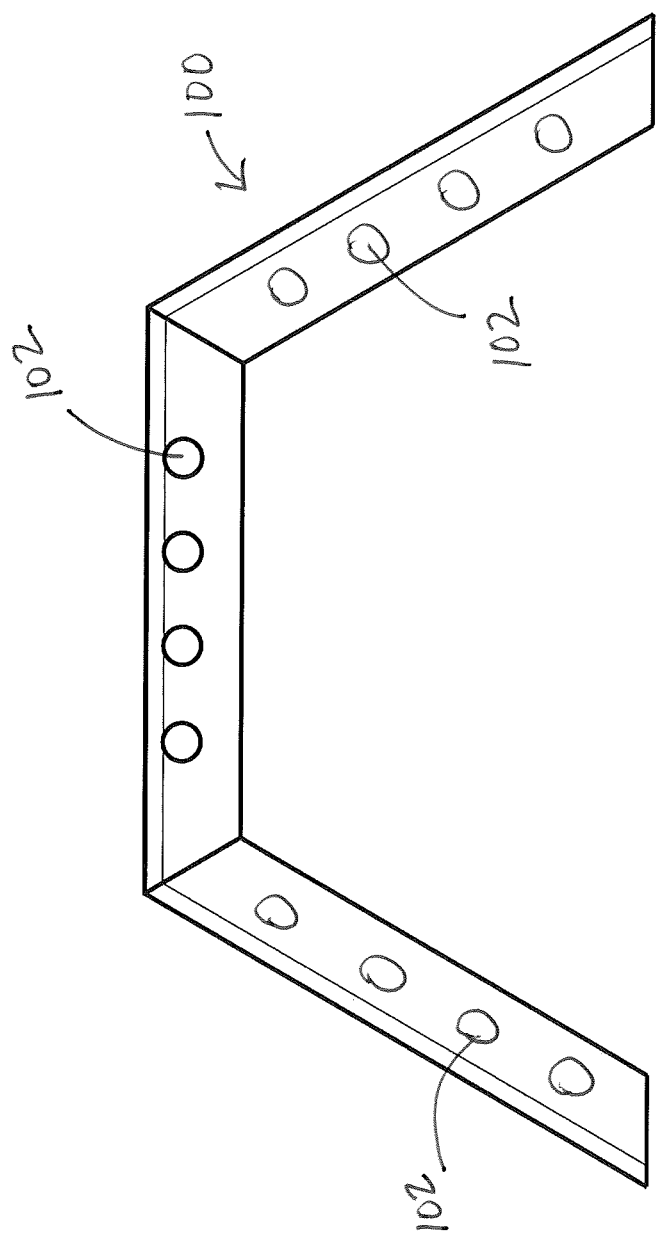
FIG. 12 is a side view of the top segment bars used in the honey loft.

In some embodiments, a top half portion of the hive can be constructed with customized dimensions such that it can sit on top of other standard or prior art hives. This "loft" can be used as extra space for the honey bees to store honey above their main hive such that the honey can be collected without disturbing the bars and combs in the main portion of the hive. The loft can use top bar segments similar or identical to those used in the hive 10, however, as shown in FIG. 12, these top bar segments 100 can have more openings 102 on each of the bar segments to form multiple longitudinal passages to provide the bees with easier passage between the main hive below.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A hive for housing a plurality of honey bees, comprising:
   a substantially hollow hexagonal shaped structure that includes a three-side base forming one-half of a hexagon and a three-sided exterior roof forming the other half of the hexagon, the base and the roof configured to fit together with a front plate and an end plate to form the substantially hollow hexagonal structure to house the honey bees; and
   at least one interior bar in the shape of one-half of a hexagon configured to rest on top of the base and under the roof such that the half hexagonal shape of the at least one interior bar approximately matches the half hexagonal shape of the roof, the at least one interior bar having a plurality of openings extending through its cross-section for bees to travel through, the at least one interior bar being configured to retain a honeycomb hanging therefrom, the honeycomb being able to hang down into the base, wherein the at least one interior bar is comprised of three segments including a top segment and two side segments, all situated at hexagonal angles relative to one another, wherein the top segment of the at least one interior bar includes a lateral vent extending along at least a portion thereof configured to allow passage of air in and out of the hive for ventilation, without allowing passage of bees, and wherein the at least one interior bar has a cross-section shaped like a generally equilateral triangle.

2. The hive of claim 1, wherein the base includes a ledge situated on an interior surface thereof and configured to retain an outer edge of the at least one interior bar.

3. The hive of claim 1, wherein the plurality of openings comprise four openings substantially equidistantly placed, extending through the cross-section of the at least one interior bar.

4. The hive of claim 1, wherein the at least one interior bar comprises a plurality of interior bars situated side-by-side and extending along a full length of the hive.

5. The hive of claim 1, further comprising a ventilation slot extending through the front plate and the end plate such that the slot allows ventilation across a top of the interior bar and below the roof.

6. The hive of claim 5, further comprising a ventilation drawer configured to be adjustably and removably engaged with the ventilation slot such that the ventilation drawer can be rotated and moved to allow different levels of ventilation across the at least one interior bar and/or through the openings in the at least one interior bar.

7. The hive of claim 1, wherein the front panel includes an opening near its base to allow bees in and out of the hive, and a landing board extending out from the opening for the bees to land on as they pass in and out of the hive.

\* \* \* \* \*